United States Patent [19]
Olsen

[11] Patent Number: 5,256,110
[45] Date of Patent: Oct. 26, 1993

[54] CONTINUOUS INFINITE-RATIO POWER TRANSMISSION DEVICE

[76] Inventor: William K. Olsen, 215 S. Whitcomb, Fort Collins, Colo. 80521

[21] Appl. No.: 699,978

[22] Filed: May 13, 1991

[51] Int. Cl.⁵ .................. F16H 59/00; F16H 15/16
[52] U.S. Cl. .................................................. 474/69
[58] Field of Search ............... 74/191, 193; 474/69, 474/58, 61

[56] References Cited

U.S. PATENT DOCUMENTS

| | | | |
|---|---|---|---|
| 1,262,467 | 4/1918 | Dormann | 74/193 |
| 2,353,448 | 7/1944 | Edlich | 74/193 X |
| 2,570,493 | 10/1951 | Schmidt | 74/193 |
| 2,612,784 | 10/1952 | Patzak | 74/193 X |
| 2,642,749 | 6/1953 | Wood | 74/191 |
| 2,715,841 | 8/1955 | Franz | 74/191 |
| 2,734,389 | 2/1956 | Strecker | 74/191 X |
| 3,420,114 | 1/1969 | Prestl | 74/191 |
| 3,873,128 | 3/1975 | Dunder | 74/193 X |
| 3,906,810 | 9/1975 | Glendening | 74/395 |
| 4,299,581 | 11/1981 | Korosue | 474/69 |
| 4,448,087 | 5/1984 | Barzel | 74/193 |
| 4,457,739 | 7/1984 | Iseman | 474/49 |
| 4,549,874 | 10/1985 | Wen | 474/69 |
| 4,713,042 | 12/1987 | Imhoff | 474/69 |
| 4,857,035 | 8/1989 | Anderson | 474/69 |
| 4,865,313 | 9/1989 | Kuo | 272/69 |
| 4,905,529 | 3/1990 | Nakano | 74/193 X |
| 4,913,686 | 4/1990 | Hattori | 474/69 |
| 4,963,120 | 10/1990 | Meyering | 474/69 |

FOREIGN PATENT DOCUMENTS

| | | | |
|---|---|---|---|
| 62-255652 | 11/1987 | Japan | 74/191 |
| 721624 | 3/1980 | U.S.S.R. | 74/191 |
| 698392 | 10/1953 | United Kingdom | 74/191 |
| 8200693 | 3/1982 | World Int. Prop. O. | 74/191 |

OTHER PUBLICATIONS

Carl Zimmer, "Easy Rider", in Discover Magazine, Aug. 1990, p. 30.

Primary Examiner—Rodney M. Lindsey

[57] ABSTRACT

A power transmission device in which a drive wheel (1) and frictional ring (4) transmit rotational power from a driving arc-shaped cone (7) to a driven arc-shaped cone (5). The drive wheel (1) is rotatably attached to a holding frame (9), such that the drive wheel (1) is permitted substantially free rotation about an axle (3). One end of a holding frame (9) is rotatably attached with a control shaft (11) to a mounting structure (14). The other end of the holding frame (9) is rotatably attached with a control shaft (10) to a mounting structure (13). The drive wheel (1) and holding frame (9) can therefore pivot as a unit about an axis situated through control shaft (10) and control shaft (11). Driving arc-shaped cone (7) is fixedly attached to a driving shaft (8). The driving shaft (8) is rotatably attached to a mounting structure (15) and a second mounting structure (16). Driven arc-shaped cone (5) is fixedly attached to a driven shaft (6). The driven shaft (6) is rotatably attached to the mounting structures (15 and 16). In operation, a control lever (12) is actuated to pivot the drive wheel (1) and frictional ring (4) to a selected drive ratio. The active drive ratio is determined by the position of the drive wheel (1) as it contacts the driving arc-shaped cone (7) and driven arc-shaped cone (5). This device therefore provides an infinite selection of drive ratios within the range of drive ratios provided by the particular dimensions of such a device. The transition from one drive ratio to another drive ratio is smooth and continuous.

5 Claims, 8 Drawing Sheets

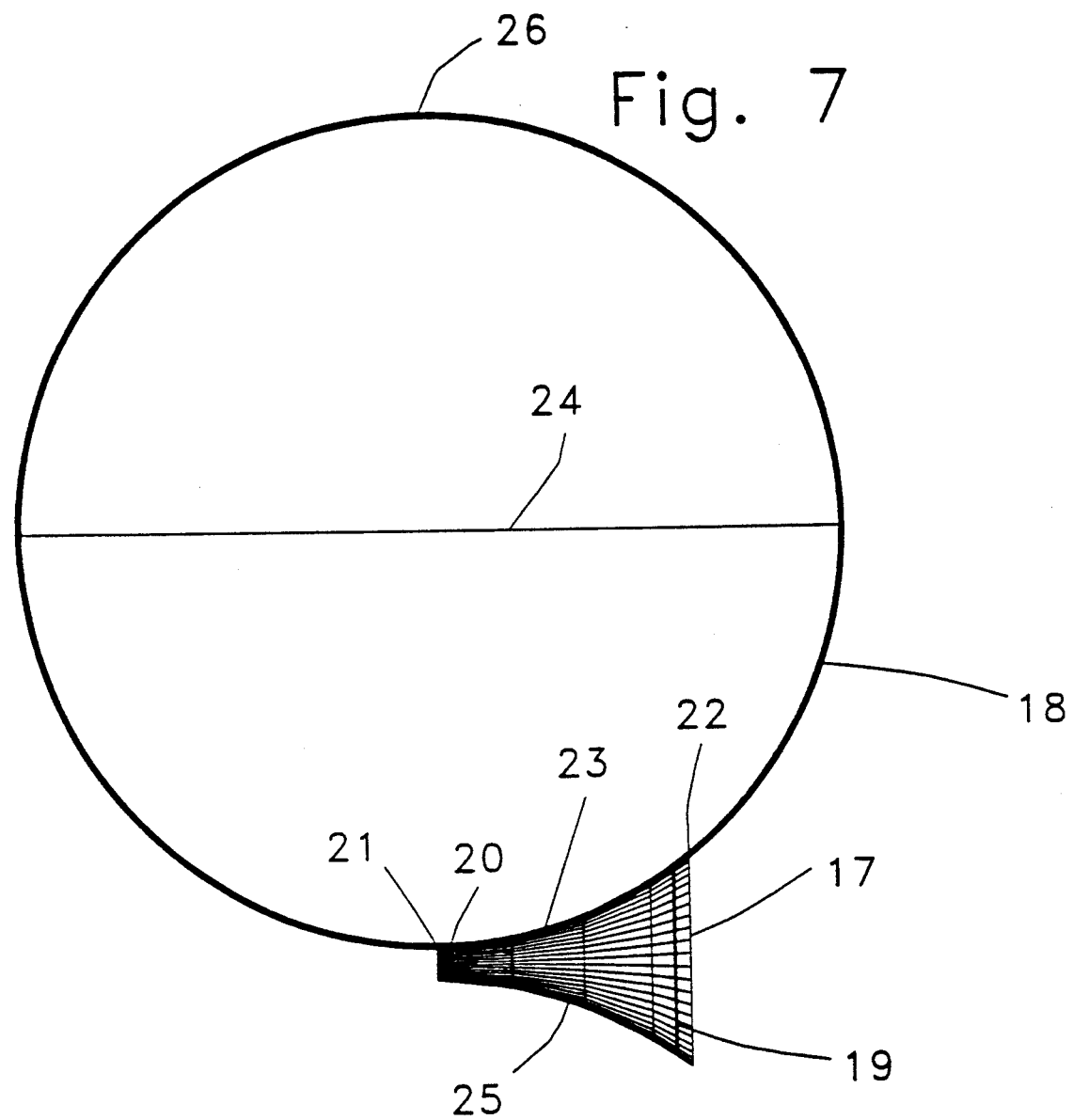

FIG. 8

| EXAMPLE NUMBER | ARC-SHAPED CONE | | | | RATIO OF |
|---|---|---|---|---|---|
| | OPERATIONAL CROSS-SECTION | RADIUS | DIAMETER | CIRCUM-FERENCE | DRIVING:DRIVEN |
| 1 | SMALLEST | 0.063 | 0.125 | 0.393 | 1.000 : 0.125 |
| | LARGEST | 0.500 | 1.000 | 3.142 | 1.000 : 8.000 |
| 2 | SMALLEST | 0.063 | 0.125 | 0.393 | 1.000 : 0.063 |
| | LARGEST | 1.000 | 2.000 | 6.283 | 1.000 : 16.00 |
| 3 | SMALLEST | 0.125 | 0.250 | 0.785 | 1.000 : 0.050 |
| | LARGEST | 2.500 | 5.000 | 15.708 | 1.000 : 20.00 |
| 4 | SMALLEST | 0.125 | 0.250 | 0.785 | 1.000 : 0.167 |
| | LARGEST | 0.750 | 1.500 | 4.712 | 1.000 : 6.000 |
| 5 | SMALLEST | 0.125 | 0.250 | 0.785 | 1.000 : 0.014 |
| | LARGEST | 9.000 | 18.000 | 56.549 | 1.000 :72.000 |

| | SPROCKET ID | NUMBER OF SPROCKET TEETH |
|---|---|---|
| THESE SIZES } | LARGEST FRONT | 52 |
| | LARGEST BACK | 32 |
| | SMALLEST FRONT | 21 |
| | SMALLEST BACK | 12 |

| | RATIO OF DRIVING : DRIVEN | |
|---|---|---|
| YIELD THIS RANGE OF RATIOS } | 1.000 : 0.656 | (LOW RATIO) |
| | 1.000 : 4.333 | (HIGH RATIO) |

CONTINUOUS INFINITE-RATIO POWER TRANSMISSION DEVICE

FIELD OF THE INVENTION

The present invention relates to manual and automatic multi-ratio and infinite-ratio drives or transmissions for use on bicycles, motorcycles, other motor vehicles or any other devices wherein a multi-ratio or infinite-ratio drive is required or desirable.

DESCRIPTION OF RELATED ART

There are many applications that benefit from the ability to change drive ratios. Increasing the number of available drive ratios, providing for a continuous, or stepless, ratio transition, and applying automatic control to optimal ratio selection have each long been sought as goals in further improving mechanical efficiency and convenience. In the past, however, these goals have been sought with devices that increase weight or cost, or are so complex and unwieldy that practical use is not attainable.

Bicycles are a classic example of the quest for improved drive design. Most common are improvements or variation in the traditional bicycle transmission, comprised of a rotary drive sprocket with attached pedals in opposing orientation, with an endless chain or belt transferring rotational energy from the drive sprocket to a driven sprocket on the rear wheel. Changing drive ratios involves changing one or the other sprocket diameters either directly or by shifting to an adjacent differently-sized sprocket.

Iseman U.S. Pat. No. 4,457,739 of Jul. 3, 1984 increases the number of available drive ratios but the selection is nowhere near infinite. A highly modified flexible drive chain is used for transfer of power from front to rear sprockets and results in a complex and cumbersome design.

Anderson U.S. Pat. No. 4,857,035 of Aug. 15, 1989 addresses an expanded range of drive ratios, and infinite and automatic selection of ratios within that range. However, the traditional rotary motion normally associated with bicycles is abandoned in favor of reciprocating crank levers, a system that altogether is awkward and too ponderous for serious use.

Wen U.S. Pat. No. 4,549,875 of Oct. 29, 1985 also addresses automatic selection of drive ratios, but at the cost of a complex chain and lever system that abandons the traditional rotary crank motion.

Imhoff U.S. Pat. No. 4,713,042 of Dec. 15, 1987 is essentially mechanically equivalent to a typical multi-speed bicycle except for the means for displacing the chain. The derailleur is replaced with a limited-function chain tensioner, at the high cost of increased complexity in the freewheel and spoke-mounted radially-attached weights that together permit centrifugal forces acting on the weights to locate any one sprocket on the freewheel so as to engage the chain, the chain itself being situated in a stationary plane. Such a system is prone to hazards that may interfere with routine operation, adds additional weight to a conventional bicycle drive design, can not respond to rapidly-varying terrain conditions and does not alter the relatively narrow selection of drive ratios found on a conventional bicycle.

Another example of an automatic transmission for bicycles, using a chain in a stationary plane with a variable-diameter sprocket, but with a finite selection of drive ratios, is that by Chilcote (Discover, "Easy Rider", August 1990, by Carl Zimmer).

The problem is that in the past for bicycles and other manually powered vehicles, the above mentioned and other systems do not adequately improve performance and efficiency. The use of chains and belts for transfer of power from the power source to the driven component is cumbersome and continually subject to undesirable interference from external factors (and even from the operator in the case of bicycles). The drive components require frequent and often ill-timed maintenance due to exposure to environmental elements such as rain, snow, dirt and mud. Performance is seriously degraded when maintenance is either unavailable or inconvenient. Environmental limitations have become even more critical with the widespread use of all-terrain, or mountain, bikes.

Belt and pulley systems for achieving automatic control and a continuous range of drive ratios are too complex and bulky for adaptation to manually powered vehicles. One such system is seen in Hattori U.S. Pat. No. 4,913,686 of Apr. 3, 1990.

Kuo U.S. Pat. No. 4,865,313 of Sep. 12, 1989 shows, in a running exerciser, another system for changing drive ratios and consists of a driving wheel and a driven wheel located apart but in the same plane as the driving wheel. A third wheel situated in a second parallel and nearly adjacent plane has a frictional ring attached to its circumference. The ring protrudes so as to make contact with both the driving and driven wheels and acts to pass movement from the driving wheel to the driven wheel. Variable ratios are obtained by changing the position of this third wheel along the surfaces of the driving and driven wheels. The arrangement is too bulky and too inefficient for use in a precision mechanical device.

What is needed, therefore, is a simple power transmission device that offers a wide range and infinite continuous selection of drive ratios, readily adaptable to control by manual means, automatic means or a combination of manual and automatic means, capable of being isolated from degrading environmental factors, low in maintenance, and readily adaptable to a wide variety of human-powered and non-human-powered vehicles and devices wherein an infinite-ratio drive is required or desirable. The reason others in the art have not been truly successful in this area in the past is that they have mostly concentrated on the use of chains, belts, pulleys and gears. What has been lacking is an entirely new approach to drive ratios and power transmission.

SUMMARY OF THE INVENTION

It is an object of the present invention to provide a continuous infinite-ratio power transmission device that is readily adaptable to a wide variety of vehicles and devices wherein an infinite-ratio drive is required or desirable.

Another object of the present invention is to provide a continuous infinite-ratio power transmission device that changes drive ratios rapidly and smoothly.

It is a further object of the present invention to provide a continuous infinite-ratio power transmission device that is simple in design and construction, easy to maintain and relatively light in weight.

Another object of the present invention is to provide a continuous infinite-ratio power transmission device with a range of drive ratios far greater than that found in conventional endless-chain multi-speed bicycles.

Other objects and attendant advantages of the present invention will readily be perceived hereafter.

The present invention relates in part to a drive wheel, the circumference of the drive wheel being partially embedded with a frictional ring. The drive wheel is able to rotate about an axle, the drive wheel and the axle held in place by a holding frame that is permitted to pivot as a unit. The unit's pivot orientation is about a secondary axis located on a plane bisecting the length of the drive wheel axle. The secondary axis is also located at a right angle to the center of the drive wheel axle. The drive wheel is driven by and drives a driving arc-shaped cone and driven arc-shaped cone, respectively. The driving arc-shaped cone is fixedly attached to a driving shaft, and the driven arc-shaped cone is fixedly attached to a driven shaft. The driving and driven shafts are separated approximately 180 degrees around the drive wheel and located on the same plane as the drive wheel axle, the axis of each shaft set such that when the frictional ring of the drive wheel makes contact with the smallest end of the driving arc-shaped cone, the frictional ring on the opposite side of the drive wheel is in contact with the largest end of the driven arc-shaped cone, providing for a low drive ratio. Conversely, when the frictional ring of the drive wheel makes contact with the largest end of the driving arc-shaped cone, the frictional ring on the opposite side of the drive wheel is in contact with the smallest end of the driven arc-shaped cone, providing for a high drive ratio. The pivoting of the drive wheel and axle unit about the secondary axis described above permits any drive ratio between and including the two aforementioned extreme ratios to be selected, such selection being infinite and continuous within the range of the upper and lower drive ratios. Drive ratios are changed relative to the change in the point of contact between the driven wheel's frictional ring and the driving and driven arc-shaped cones, such change taking affect by the intended movement of a control lever fixedly attached to the holding frame unit.

Other details and features of the present invention will be apparent to those skilled in the art based upon the following detailed description, taken in combination with the accompanying drawings.

DESCRIPTION OF DRAWINGS

FIG. 7 is a plan view and shows details of the design of arc-shaped cones.

FIG. 8 is a table showing examples of drive ratio ranges attainable with corresponding arc-shaped cones of certain selected sizes.

DETAILED DESCRIPTION OF THE INVENTION

The preferred embodiments are not intended to be exhaustive or to limit the invention to the precise forms disclosed. They are chosen and described in order to best explain the principles of the invention and its application and practical use to thereby enable others skilled in the art to best utilize the invention.

A preferred embodiment—FIGS. 1 to 8

Figure 1:
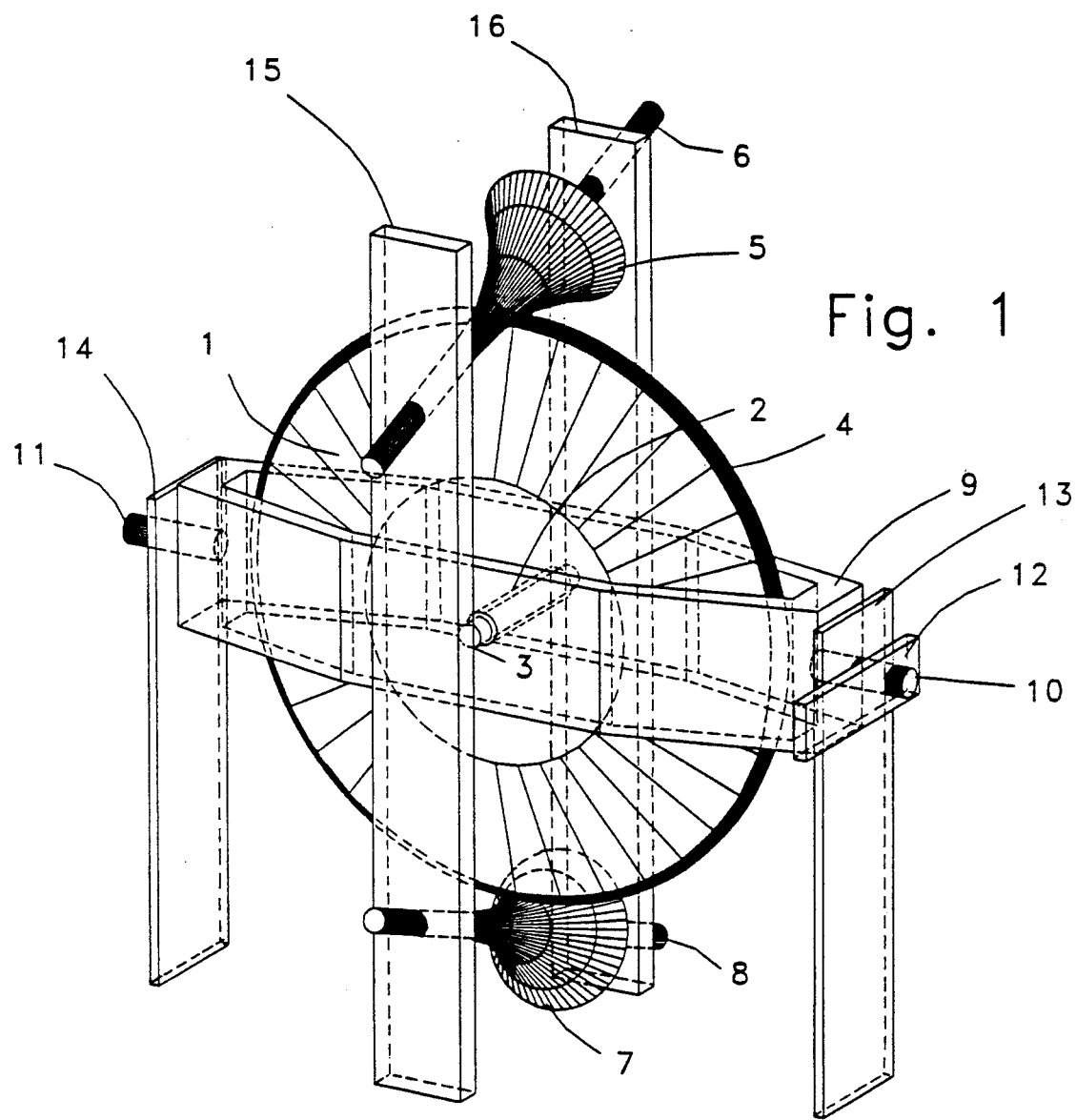
FIG. 1 is a perspective view of a preferred embodiment of the present invention.
Figure 2:
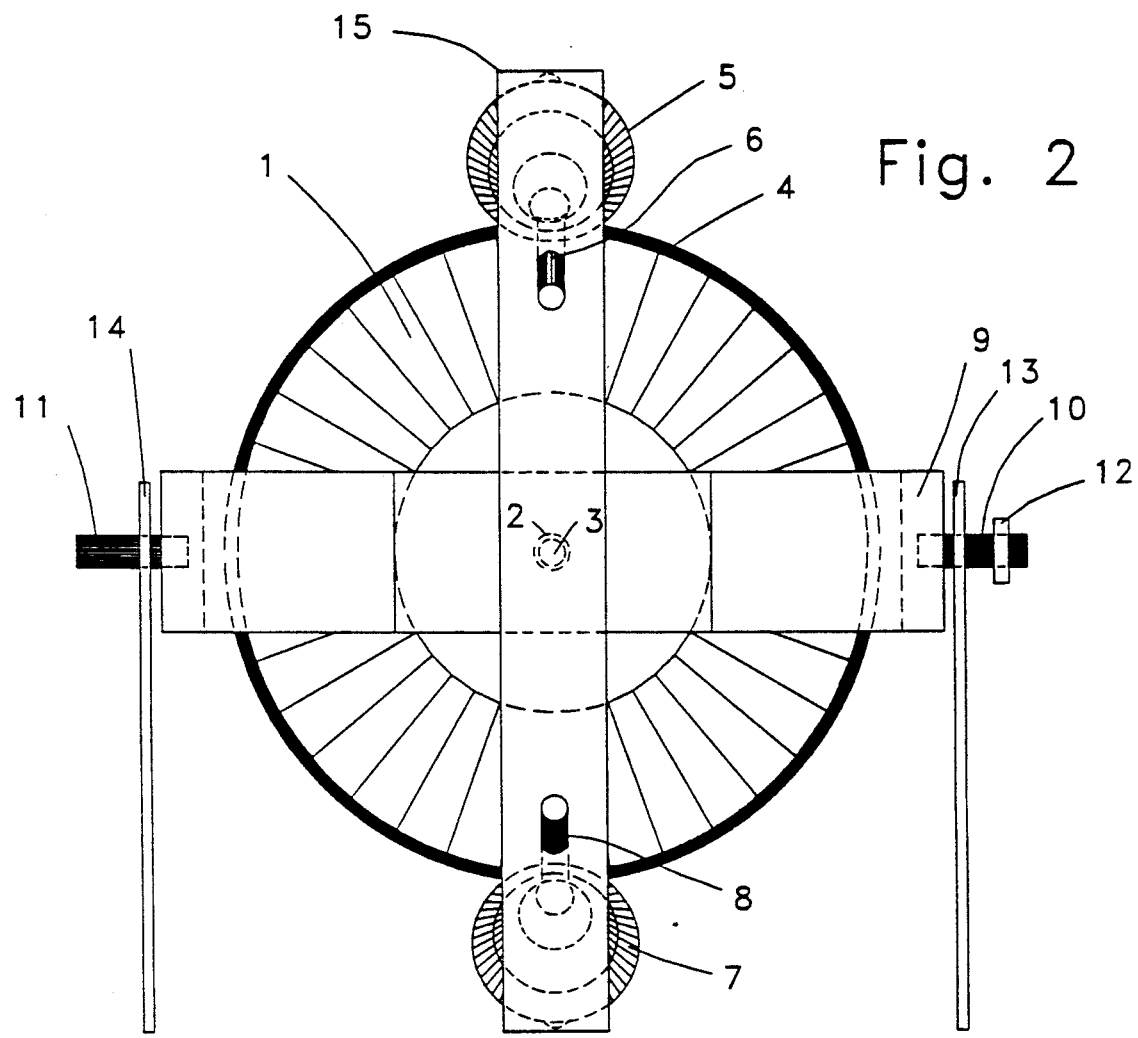
FIG. 2 shows a side view, taken from below and to the left of the view of the preferred embodiment in FIG. 1.

Refer now to a preferred embodiment of the continuous infinite-ratio power transmission device in FIG. 1, comprised of a motion-transmitting drive wheel 1 with a centered axle 3, the axle 3 so fitted to a sleeve 2 or other rotatable means to allow substantially free rotation of the drive wheel 1 about the axle 3. The drive wheel 1 is situated within a holding frame 9, such frame 9 constructed so as to encompass a diameter of the drive wheel 1 (see FIG. 2, FIG. 4), with the axle 3 of the drive wheel 1 situated in a fixed position perpendicular to the sides of and at the center of the holding frame 9 (see FIG. 2, FIG. 3). The drive wheel 1 is centered within the holding frame 9 and rotates about the axle 3 without interference from the holding frame 9. The circumference of the drive wheel 1 is comprised of a frictional ring 4 (non-metal). Two control shafts (10 and 11) are fixedly attached to the holding frame 9, one control shaft at each end of the holding frame 9, each shaft (10 and 11) situated perpendicular to the drive wheel axle 3 and centered on the plane along the length of the middle of the holding frame 9. Control shaft 11 is extended into and rotatably attached to mounting structure 14, and control shaft 10 is extended into and rotatably attached to mounting structure 13. Control lever 12 is fixedly attached to control shaft 10. Control shaft 10 and control shaft 11 can rotate freely when control lever 12 is moved to rotate the holding frame 9 and change the active drive ratio.

Figure 3:
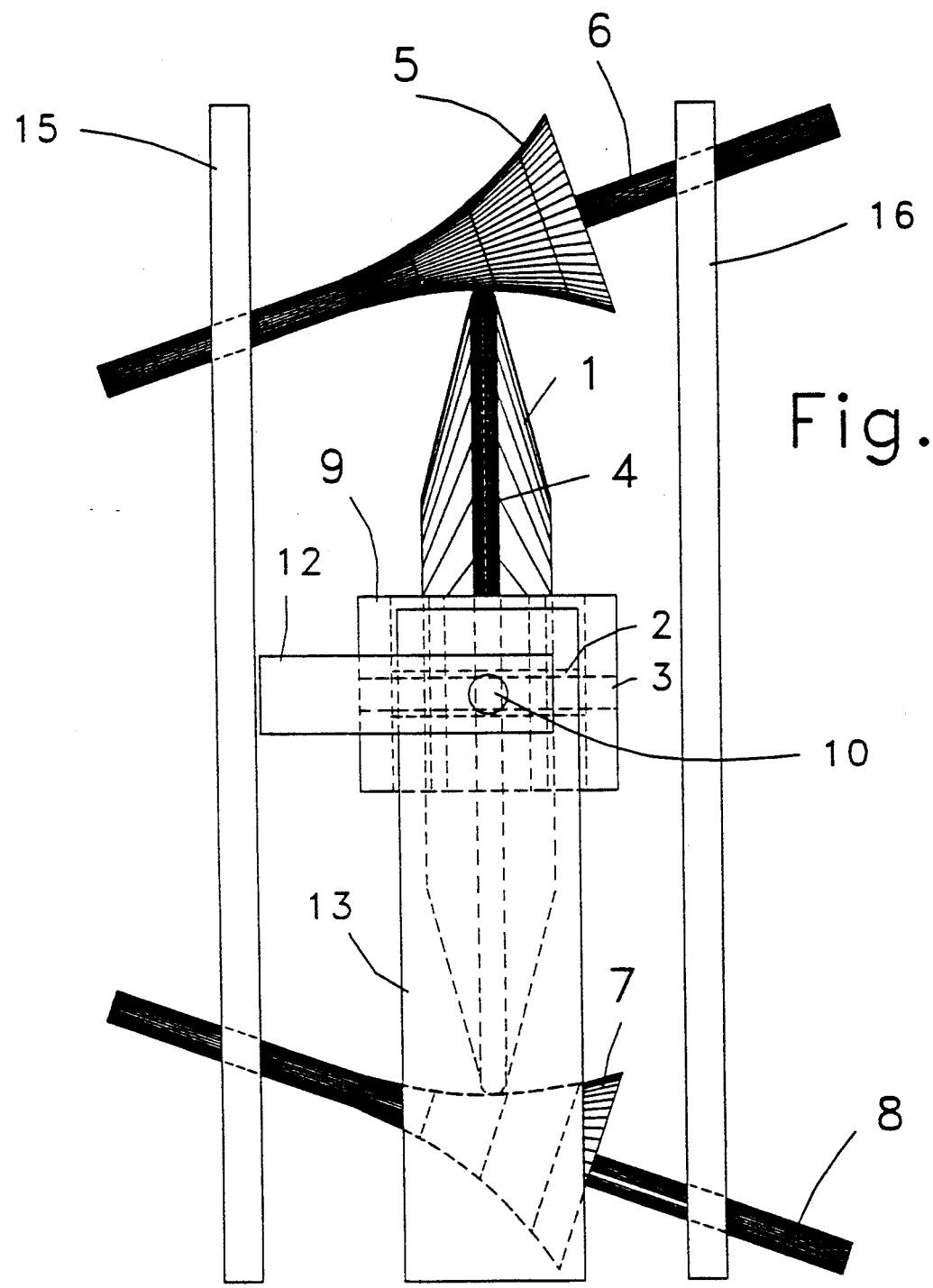
FIG. 3 shows a frontal view, taken from the right side of FIG. 1, wherein the transmission device is shown shifted to approximately a 1:1 drive ratio.
Figure 4:
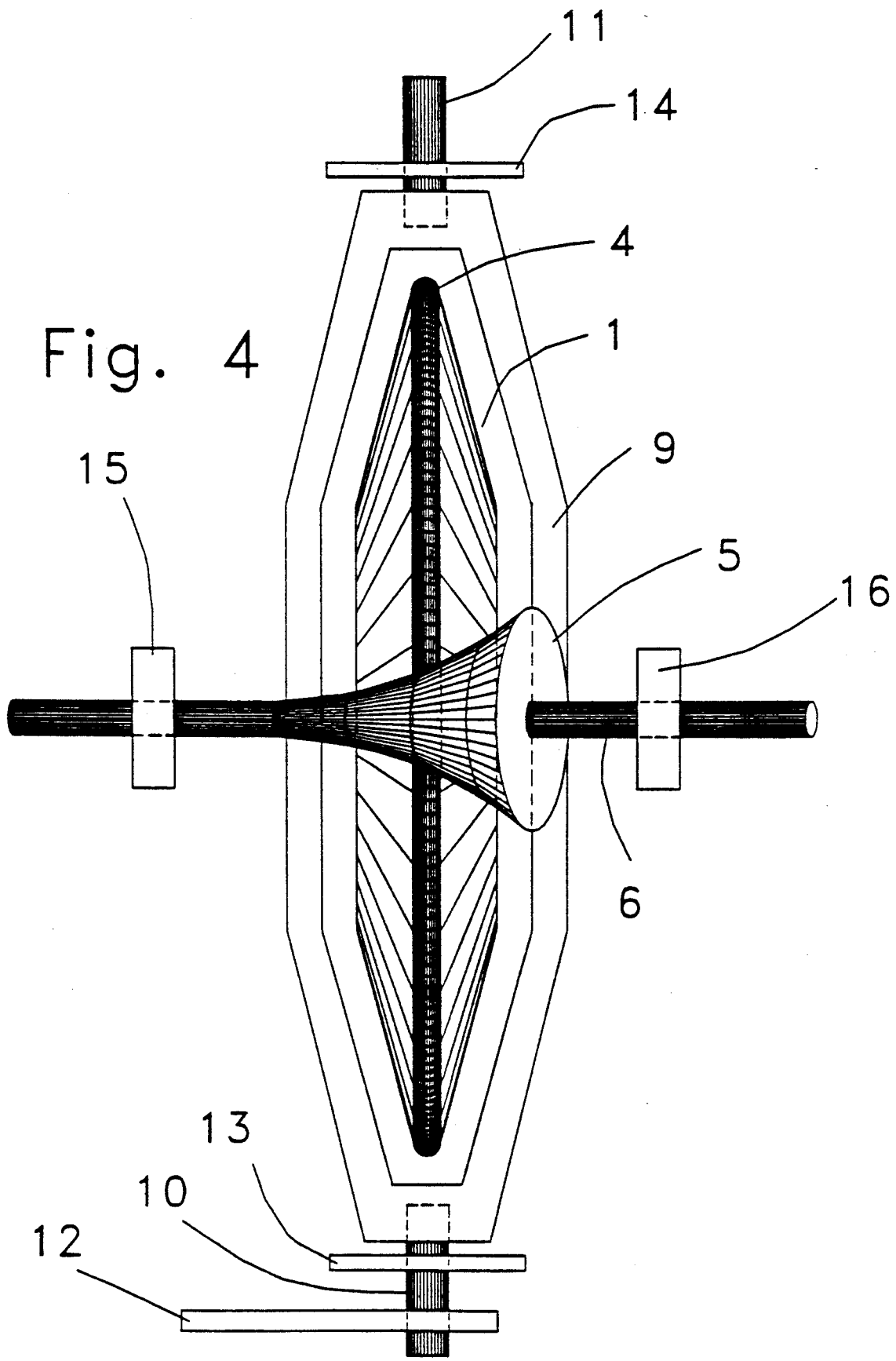
FIG. 4 shows a top view, taken from the top of the view in FIG. 1.
Figure 5:
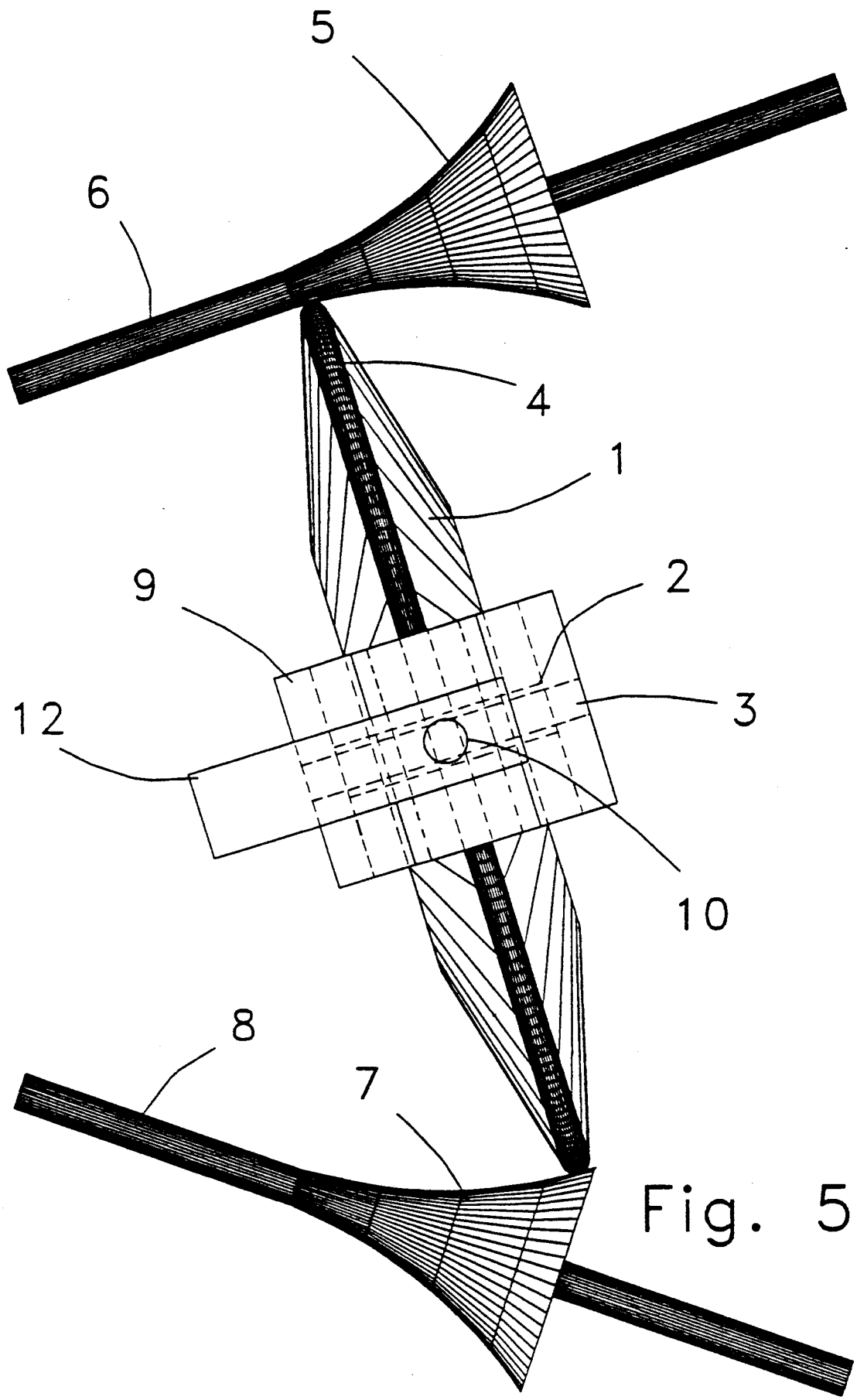
FIG. 5 is an isolated frontal view of the present invention taken from the right side of FIG. 1, without mounting structures, wherein the transmission device has been shifted to a high drive ratio.
Figure 6:
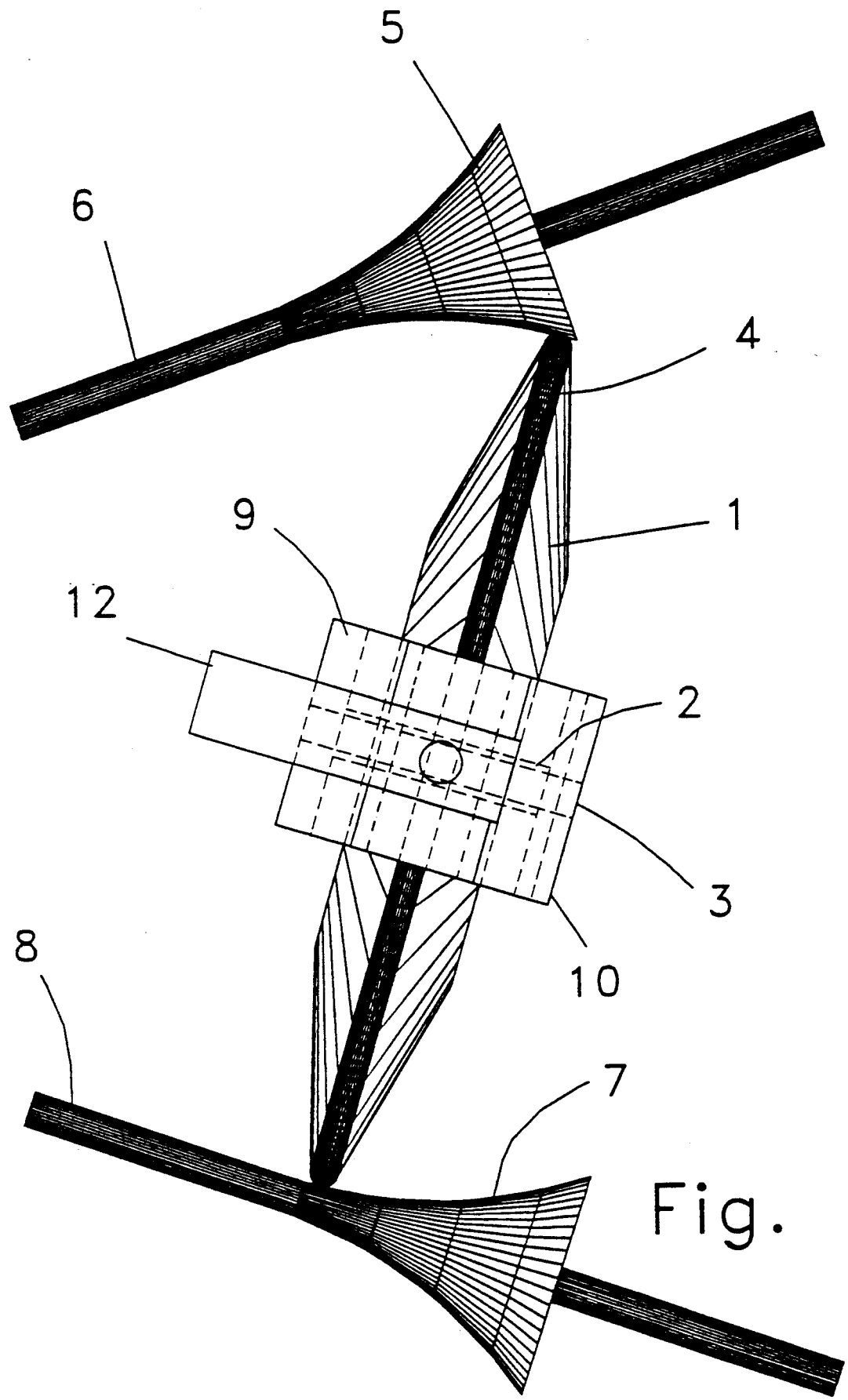
FIG. 6 shows the same isolated frontal view of FIG. 5 wherein the transmission device has been shifted to a low drive ratio.

For purposes of describing the operation of the transmission device in this embodiment, arc-shaped cones 5 and 7 are assumed to be equal in size. Driving arc-shaped cone 7 is fixedly attached to driving shaft 8, and driven arc-shaped cone 5 is fixedly attached to driven shaft 6. The driving shaft 8 is rotatably attached to the lower portions of mounting structures 15 and 16, with driving arc-shaped cone 7 situated inbetween mounting structures 15 and 16. The driven shaft 6 is rotatably attached to the upper portions of mounting structures 15 and 16, with driven arc-shaped cone 5 situated inbetween mounting structures 15 and 16. Arc-shaped cone 25, in FIG. 7, is shown for conceptual demonstration and is assumed in this discussion to be identical in dimensions to arc-shaped cones 5 and 7. The arc-shaped cones 5 and 7 are similar to cones except that a line along the surface from the cone apex 21 (see FIG. 7) to the cone base 22 outlines an arc 23. This arc 23 is identical to an arc along a circle 18 defined as follows. Referring to FIG. 3, the frictional ring 4 along the outer edge of the drive wheel 1 is expected to face some degree of compression from the driving and driven arc-shaped cones (7 and 5 respectively). For the circumference of the drive wheel 1 and as the drive wheel rotates, the expected compression pushes on the frictional ring 4, and that compressed surface of the frictional ring 4 then outlines a circle with a center at the same location as the center of the drive wheel 1. Circle 18 (see FIG. 7) represents such a circle and has an operational diameter 24. The diameter 24 of the circle 18 is the measure desired to separate the arc-shaped cones 5 and 7 from each other, as seen in FIG. 3. A curved line 23, as seen in FIG. 7, along the surface of the arc-shaped cone, from the cone apex 21 to the cone base 22, outlines an arc identical to an arc of identical length along circle 18.

Referring back to the preferred embodiment in FIG. 1, the driving shaft 8 and driven shaft 6 are situated such that the axis of rotation of each shaft 8 and 6, and the axis of rotation through axle 3 of the drive wheel 1, are together located on a plane. In other words, a single plane bisects the length of the driving shaft 8, the driven shaft 6 and the drive wheel axle 3. The driving shaft 8 and driven shaft 6 are situated such that each is located 180 degrees from the other as measured along the circumference of the drive wheel 1. The driving shaft 8 and driven shaft 6 are also situated such that (see FIG. 5), for one extreme drive ratio, when the holding frame 9 is pivoted about the control shafts 10 and 11 with the control lever 12 such that the frictional ring 4 moves to the largest operational cross-section of the driving arc-shaped cone 7, the frictional ring 4 on the opposite side of the drive wheel 1 moves simultaneously to the smallest operational cross-section of the driven are-shaped cone 5; and, for an opposite extreme drive ratio (see FIG. 6), when the frictional ring 4 contacts the smallest operational cross-section of the driving arc-shaped cone 7, the frictional ring 4 along the opposite side of the drive wheel 1 contacts the largest operational cross-section of the driven arc-shaped cone 5. At any pivoted location of the drive wheel 1 and frictional ring 4 across this described path and between the two aforementioned extremes in drive ratio, the frictional ring 4 maintains concurrent contact with both the driving and driven arc-shaped cones (7 and 5 respectively). Further, it may be noted that a first line, extending from and perpendicular to the drive wheel axle 3 through the center of the drive wheel 1, passing through the center of the area of contact between the frictional ring 4 and the driven arc-shaped cone 5, will always fall perpendicular to a second line drawn parallel to the drive wheel axle 3 and tangentially to the arc of the circumference of the drive wheel 1 at the center of the area of contact between the frictional ring 4 and the driven arc-shaped cone 5. The same principle holds for the driving arc-shaped cone 7. In other words, the distance from the center of the drive wheel 1 to the contacting surface of either arc-shaped cone 5 and 7 is always the same, regardless of the drive ratio chosen. Thus, the distance from the center of the area of contact between the frictional ring 4 and the driving arc-shaped cone 7, through the center of drive wheel 1 and to the center of the area of contact between the frictional ring 4 and the driven arc-shaped cone 5, is always the same and always equal to the operational diameter of the drive wheel 1.

Operation

Rotation of the driving shaft 8, and hence the rotation of driving arc-shaped cone 7, transfers rotational power to the drive wheel 1, and the drive wheel 1 transfers rotational power to the driven arc-shaped cone 5, hence rotating the driven shaft 6. Any desired drive ratio between and including the two aforementioned extremes in drive ratios can be selected by the pivoting of the drive wheel 1.

The control lever 12 is actuated to pivot the holding frame 9 and drive wheel 1 to the desired drive ratio. The control lever 12 actuation can be manual, or it can be automatic based on some measure and calculation of efficiency, such as rotational input speed versus rotational output speed. The point here is not the method chosen to decide which drive ratio is optimal. Rather, the point is that once a new drive ratio is desired, the control lever 12 is actuated to achieve the new ratio. Actuation of the control lever 12 pivots the holding frame 9 and the drive wheel 1, resulting in a change in the ratio of the driving arc-shaped cone 7 revolutions to driven arc-shaped cone 5 revolutions. A low drive ratio would result when the drive wheel 1 is driven by the small end of the driving arc-shaped cone 7, and the drive wheel 1 is driving the large end of the driven arc-shaped cone 5 (see FIG. 6). Then, a relatively large number of revolutions of the input driving shaft 8 are needed for each revolution of the driven shaft 6. As the control lever 12 is moved, the drive ratio increases until the drive wheel 1 reaches opposite ends of the driving arc-shaped cone 7 and driven arc-shaped cone 5, where a high drive ratio results as the driven shaft 6 revolves many times for each revolution of the driving shaft 8 (see FIG. 5). This process of shifting can be reversed to again achieve the lowest drive ratio, or the control lever 12 can be stopped at any point between the highest and lowest ratios, allowing for an infinite selection of drive ratios within the drive ratio range of the present invention. This discussion by no means limits the precise drive ratios that can be achieved with the present invention. Certainly others skilled in the art will recognize that drive ratios to the input driving shaft 8 can be altered before delivery to the present invention, and that power output from the present invention via the driven shaft 6 can be altered afterwards, and that in fact more than one such present invention could be operated in series or other arrangement to further expand the range of available drive ratios. Different uses of the present invention may require different ranges of input and output drive ratios. The actual pivoting of the holding frame 9 may depend on a minimal rotation speed for the drive wheel 1, depending on application, which others skilled in the art will also recognize. The point is that drive ratios to and from the present invention are not intended to be limiting and can be altered without altering the importance and general function of the present invention.

Now refer to FIG. 7, which shows the technical design relationship between the arc-shaped cones and the drive wheel. As best as can be determined, the single most important stabilizing factor for the present invention is the matching of the arc 23 along the arc-shaped cone with the arc, or equivalent-length section of circle 18, where circle 18 lies along the surface of compressed frictional ring 4 of the drive wheel 1, as described earlier. This feature in part ensures equal distance from the drive wheel center to the arc along each of the arc-shaped cones at the center of the area of contact with the frictional ring 4, throughout the range of drive ratios. Tests have shown this system to be very stable in that the drive wheel 1, throughout the range of available drive ratios, is always perpendicular to a line drawn tangent to the arc surface of either arc-shaped cone. This tangent line (a) passes through the point at the center of the area of contact between the frictional ring 4 and either arc-shaped cone (5 and 7), (b) contacts the arc-shaped cone at the point of tangency only, and (c) lies parallel to the axis of rotation through control shafts 10 and 11, around which holding frame 9 and drive wheel 1 pivot for specific selection of drive ratios.

In other words, the drive wheel 1 seems to have no physical incentive to move to a different drive ratio other than through actuation of the control lever 12. When the control lever 12 is actuated, the drive wheel 1 will rotate with the holding frame 9 very readily to the newly selected drive ratio. This movement, or pivot, of the drive wheel 1 appears to operate best when at least some minimal rotation of the drive wheel 1 is occurring, a factor that may be compared with steering the wheels on a parked car versus steering the wheels on a moving car. Additionally, because response of the drive wheel 1 to the control lever 12 actuation is very fast but not instantaneous, a time-delay means for the control lever 12 may be required, including but not limited to a slightly flexible control lever 12. When the drive wheel 1 is not rotating about the axle 3, such a delay mechanism will also allow drive-ratio-changing movement directed at the holding frame 9 to be stored as potential energy until the drive wheel 1 returns to rotating about the axle 3, at which time the drive wheel 1 will rapidly travel to the desired drive ratio. Structurally increasing the rotational speed of driving and driven shafts (8 and 6 respectively) of the present invention, relative to the rotational speed of a power source and a component driven by the present invention, by gearing or other means, will improve response time of the drive wheel 1 to force from the control lever 12, depending on application.

Referring again to FIG. 7, 20 marks for numerical demonstration a cross-section, or circle, about the small end of an arc-shaped cone 25, while 19 marks a cross-section, or circle, about the large end of the same arc-shaped cone 25. Arc-shaped cones 5, 7, and demonstration arc-shaped cone 25 have been selected for explanation purposes only and the figures are not intended to limit their size in actual practice. Arc 23, for example, could be longer or shorter for an arc-shaped cone 25 as related to circle 18, depending upon the desired use of the invention and desired drive ratios. Likewise, arc-shaped cone 5 and arc-shaped cone 7 could also vary in size with respect to the arc-surfaces. The selected diameter of the arc-shaped cone apex 21, and hence the diameter of the whole arc-shaped cone, could also vary, thus offering a very large choice of overall cross-sectional diameters for arc-shaped cones. Here, under the assumption for discussion that the driving and driven arc-shaped cones are the same size; and, under the additional assumption concerning the pivot of the drive wheel 1 about the axis of the control shafts 10 and 11, the additional assumption being that the axis of the control shafts 10 and 11 is centered on the drive wheel 1; then, the relative sizes of circle 19 and circle 20 together determine the full range of drive ratios available in the present invention. Circle 19 and circle 20 each represent the center of an area of contact between frictional ring 4 and a rotating arc-shaped cone 25. For clarity and discussion, circle 19 represents one extreme position of contact with frictional ring 4, and circle 20 represents the opposite extreme position of contact with frictional ring 4. The lowest ratio available would be $$1 : \frac{\text{(circumference of circle 20)}}{\text{(circumference of circle 19)}}$$

and the highest ratio available would be $$1 : \frac{\text{(circumference of circle 19)}}{\text{(circumference of circle 20)}}$$

Referring to FIG. 8, a table is provided listing just a few of the very many possible relationships between arc-shaped cone size and drive ratios, for the purpose of demonstrating and comparing several of the very many drive ratio ranges that may be attained with the present invention. The driving and driven arc-shaped cones in FIG. 8 are assumed to be of the same dimensions; all values in FIG. 8 are given for example and demonstration only, and by no means limit the combinations and sizes of driving arc-shaped cones and driven arc-shaped cones that can be constructed and combined. Units are scaleless and are for demonstration purposes. For approximate comparisons with bicycles, a lowest ratio commonly available on a mountain bicycle is generally 1 driving (pedal) revolution to 0.656 driven (wheel) revolutions (1:0.656). On road bicycles, which generally have higher ratios due to the smoother terrain they are intended to be used on, a high commonly available ratio can be 1 driving (pedal) revolution to 4.333 driven (wheel) revolutions (1:4.333). These possible conventional bicycle drive ratios are also shown in FIG. 8. Looking at example 1 in FIG. 8, where the circle 20 in FIG. 7 might have a circumference of 0.393 units, and circle 19 might have a circumference of 3.142 units, the drive ratio range is from 1:0.125 for a low ratio to 1:1:8.00 for a high ratio. Obviously this range is far greater than what is commonly available on bicycles. Example 2 of FIG. 8 shows how increasing the length of arc-shaped curve 25 along arc 23, and hence the circumference of circle 19, readily increases the available drive ratio range. When circle 19 has a circumference of approximately 6.283 units and circle 20 has a circumference of approximately 0.393 units, 1:0.063 is the lowest available ratio and 1:16 the highest ratio. Examples 3 and 4 of FIG. 8 also demonstrate how the overall dimensions of the arc-shaped cones can change, and the associated drive ratios are provided. The relative angle between the driving shaft 8 and driven shaft 6, as well as the degree of holding frame 9 pivoting provided, will vary depending on the overall dimensions of the driving arc-shaped cone 7 and driven arc-shaped cone 5. Modifications of this relative angle would be based on the relationship between the drive wheel 1, and the extreme ratios discussed earlier that define the range of drive ratios available in the present invention. In other words, the range of drive ratios provided according to the sizes of the driving arc-shaped cone 7 and the driven arc-shaped cone 8 contribute to determination of the relative angle of the arc-shaped cones to each other, and therefore to determination of the relative angle of the driving and driven shafts (8 and 6 respectively) to each other, as well as to the degree of holding frame 9 pivoting that must be accommodated. Other factors will also contribute to this positioning, such as location of the driving and driven shafts (8 and 6 respectively) about the circumference of the drive wheel 1, and relative placement, with respect to the center of the drive wheel 1, of the holding frame 9 and the axis of rotation of the control shafts 10 and 11.

The base 22 of cone 25, as described for demonstration purposes and as viewed in FIG. 7, could be further extended with arc 23, even beyond the specified marked diameter 24, further increasing the drive ratio range.

SUMMARY, RAMIFICATIONS AND SCOPE

The foregoing describes a power transmission system that provides a continuous and infinite selection of drive ratios through the use of a driving arc-shaped cone, a drive wheel and a driven arc-shaped cone. The present invention meets the aforementioned objectives as follows. The present invention provides continuous infinite-ratio power transmission in a device that is simple in construction, easy to maintain and relatively light in weight. The present invention allows drive ratios to be changed rapidly and smoothly.

As demonstrated in this discussion, the present invention is extremely versatile in design and use.

The foregoing description of the invention has been presented for the purposes of illustration and description. It is not intended to be exhaustive or to limit the invention to the precise forms disclosed. Many modifications and variations are possible in light of the above teaching. For example, using FIG. 1 for reference to components:

The driving arc-shaped cone 7 and driven arc-shaped cone 5 could be situated about the drive wheel 1 circumference at angles substantially different than 180 degrees.

The arc-shaped cones 7 and 5 could be provided with friction surfaces, and the circumference of the drive wheel 1 could be either a frictional or non-frictional surface, depending in part on requirements for heat dissipation in a specific transmission device application.

The holding frame 9 and the corresponding secondary pivoting axis through control shafts 10 and 11 does not necessarily have to pass through the center of the drive wheel 1 and drive wheel axle 3. In fact, the secondary pivoting axis of the holding frame 9 could be offset from the center of the drive wheel 1 toward one or the other arc-shaped cone so as to provide for unequal arc travel of the opposite sides of the drive wheel 1, thus requiring the arc surfaces of the arc-shaped cones 5 and 7 to be of different dimensions.

The control lever 12, of course, could be attached at any one of many areas on control shaft 10, control shaft 11, or holding frame 9.

The mounting structures are shown only for purposes of demonstration, and in fact the exact form and location of the mounting structures are dependent on each specific use and form of the transmission device.

The drive wheel is provided with a frictional surface on the circumference portion thereof. The frictional ring 4 of drive wheel 1 could be replaced by a frictional surface or even a drive wheel 1 entirely composed of a friction-providing material, the main point being that some degree of friction is required between the drive wheel 1 and the arc-shaped cones 5 and 7. An advantage of the frictional ring 4 as described in the preferred embodiment is that it could be readily replaceable, especially when the friction ring 4 is partially embedded within a matching groove around the circumference of the drive wheel 1.

There could be more than one driving arc-shaped cone, and likewise more than one driven arc-shaped cone, for receipt and output of rotational power. And, such arc-shaped cones could be of different dimensions, and even situated apart from each other so as to provide for two or more simultaneous drive ratios.

The drive wheel 1 could be replaced with a similarly-functioning conveyor-belt-type device that does not rotate itself but instead permits a belt to rotate about end-wheels that push and hold the belt against the arc-shaped cones, while maintaining the pivoting ability of drive wheel 1. However, a drive wheel 1 as described in the preferred embodiments may provide better heat dissipation and improved longevity of the frictional ring in many applications.

The arc-shaped cones 5 and 7, of course, could be manufactured separately and then fixedly attached to the respective drive shafts 6 and 8, or the arc-shaped cones and respective shafts could be manufactured as one-piece units.

The apex 21 of arc-shaped cone 25, as shown for demonstration purposes in FIG. 7, could be further extended to the left as viewed in FIG. 7, further increasing the flexibility of available arc-shaped cone designs and related drive ratios.

The driving arc-shaped cone 7, the driving shaft 8, the driven arc-shaped cone 5, and the driven shaft 6 could each be situated and supported such that as a unit these parts could pivot about a non-pivoting drive wheel 1.

The drive wheel can be comprised of solid matter for improved heat dissipation and reduced air resistance, depending on the specific use of the transmission device.

The drive wheel can be comprised of spoked or cutout sections for improved weight and strength characteristics, depending on the specific use of the transmission device.

The drive wheel can be comprised of spokes angled to increase airflow for improved heat dissipation, depending on the specific use of the transmission device.

Thus it can be seen that the present invention can be utilized in many different manners. The principle, however, remains the same, in that arc-shaped cones are used as the source of an infinite selection of drive ratios, and a manner for conveying rotational energy such as drive wheel 1 provides for a continuous transition among the drive ratios.

It is intended that the scope of the invention be limited not by this detailed description, but rather by the claims appended hereto.

I claim:

1. A continuous infinite-ratio power transmission device comprising:
   (a) a power-transmitting drive wheel,
   (b) a driving arc-shaped cone,
   (c) a driven arc-shaped cone, said drive wheel provided with a frictional surface on a circumference portion thereof and an axle said drive wheel by said axle within a holding frame, said holding frame supported for rotation by a pair of control shafts, each said control shaft located opposite the other along a common axis situated substantially perpendicular to and substantially bisecting said axle of said drive wheel, said driving arc-shaped cone and said driven arc-shaped cone each fixedly attached to a driving shaft and driven shaft respectively, each said arc-shaped cone comprised such that the arc surface of each said arc-shaped cone is substantially equal in measure to a respective second arc of equal dimensions, said second arc located on a circle about the circumference of said drive wheel, said driving shaft separated from said driven shaft by an angle about the circumference of said drive wheel and relative to the center of said drive wheel, said angle being substantially close to 180 degrees, wherein the axes of rotation of said driving shaft, said drive wheel and said driven shaft lie substantially in a single plane, said driving arc-shaped cone and said driven arc-shaped cone further situated such that there is substantially equal contact between said drive wheel circumference and the respective arc-shaped cones, said contact being continuously maintained throughout travel of the drive wheel as incurred through means for pivoting of said holding frame, whereby, pivoting of said holding frame permits selection of any drive ratio within the range of drive ratios as provided by and limited by the relative size and orientation of said driving arc-shaped cone, said driven arc-shaped cone and said drive wheel.

2. A continuous infinite-ratio power transmission device as defined in claim 1, wherein said frictional surface on said circumference of said drive wheel is comprised of a frictional ring partially embedded within a matching groove around said circumference of said drive wheel.

3. A continuous infinite-ratio power transmission device as defined in claim 1, wherein said means for pivoting said holding frame is comprised of a control lever fixedly attached to either of said control shafts.

4. A continuous infinite-ratio power transmission device comprising:

(a) a power-transmitting drive wheel,
(b) a driving arc-shaped cone,
(c) a driven arc-shaped cone, said drive wheel provided with an axle, said axle including rotatable means for free rotation of said drive wheel about the axis of said drive wheel, said drive wheel provided with a frictional surface on a circumference portion thereof, said drive wheel situated within a holding frame encompassing a diameter of said drive wheel, said axle of said drive wheel retained within said holding frame such that said drive wheel is located within said holding frame so as to permit free rotation of said drive wheel about said axis of said drive wheel without incurring direct contact between said drive wheel and said holding frame, said holding frame situated in part by a pair of control shafts, each said control shaft located opposite the other along a common axis situated substantially perpendicular to and substantially bisecting said axle of said drive wheel, said control shafts rotatably attached to either end of said holding frame for engagement in a support, said control shafts enabling said holding frame an amount of pivotal movement about said control shafts, wherein said pivotal movement of said holding frame is controlled in part by actuation of a control lever, said control lever being fixedly attached to either of said control shafts so as to offer control of the pivoting movement, said driving arc-shaped cone and said driven arc-shaped cone each fixedly attached to a driving shaft and driven shaft respectively, each said arc-shaped cone comprised such that the arc surface of each said arc-shaped cone is substantially equal in measure to a respective second arc of equal dimensions, said second arc located on a circle about the circumference of said drive wheel, said driving shaft and said driven shaft each being rotatably attached to support means, said support means also situating said driving arc-shaped cone and said driven arc-shaped cone about said drive wheel, said driving shaft separated from said driven shaft by an angle about the circumference of said drive wheel and relative to the center of said drive wheel, said angle being substantially close to 180 degrees, wherein the axes of rotation of said driving shaft, said drive wheel and said driven shaft lie substantially in a single plane, the axes of rotation of said driving shaft, said driving arc-shaped cone, said driven shaft and said driven arc-shaped cone further situated such that there is substantially equal contact between said drive wheel circumference and the respective arc-shaped cones, said contact being continuously maintained throughout travel of the drive wheel as incurred through the pivoting of said holding frame, said driving arc-shaped cone, said drive wheel and said driven arc-shaped cone further situated such that when the circumference of said drive wheel is contacting said driving arc-shaped cone at or near the apex, or smallest operational cross-section, of said driving arc-shaped cone, said drive wheel circumference is concurrently contacting said driven arc-shaped cone at or near the base, or largest operational cross-section, of said driven arc-shaped cone such that rotation of said driving shaft results in comparably slower rotation of said driven shaft, with said pivoting movement of said holding frame permitting a continuous decrease in the ratio of driving shaft revolutions to driven shaft revolutions, as said drive wheel circumference is urged toward and to said base of said driving arc-shaped cone, said drive wheel circumference concurrently contacting and being urged toward and to said driven arc-shaped cone at or near said apex of said driven arc-shaped cone such that rotation of said driving shaft results in comparably faster rotation of said driven shaft, such pivoting of said drive wheel also being reversible, whereby, said pivoting movement of said holding frame permits selection of any drive ratio within the range of drive ratios as provided by and limited by the relative size and orientation of said driving arc-shaped cone, said driven arc-shaped cone and said drive wheel.

5. A continuous infinite-ratio power transmission device as defined in claim 4, wherein said frictional surface of said drive wheel circumference is comprised of a frictional ring, said frictional ring being partially embedded within a matching groove around said circumference of said drive wheel.

* * * * *